United States Patent [19]
Riede et al.

[11] 3,734,298
[45] May 22, 1973

[54] DEVICE FOR DIALYSIS

[75] Inventors: Gerhard Riede, Eslov; Olov Hagstrom, Lund, both of Sweden

[73] Assignee: Gambro AG, Bern, Switzerland

[22] Filed: Nov. 12, 1971

[21] Appl. No.: 198,276

[30] Foreign Application Priority Data

Nov. 17, 1970 Sweden ..............................15512/70

[52] U.S. Cl.................................210/321, 210/541
[51] Int. Cl. ...............................................B01d 31/00
[58] Field of Search......................210/232, 321, 541

[56] References Cited

UNITED STATES PATENTS 3,458,048 7/1969 Swenson..............................210/321

Primary Examiner—Frank A. Spear, Jr.
Attorney—Ralph E. Parker et al.

[57] ABSTRACT

A dialysis device particularly for use in purification of blood is comprised of a plurality of spacer plates and pairs of intermediate membranes. The surfaces of the plates are configured in such manner that channels for purification liquid are formed between them and the membranes, and channels for the blood which is to be purified through dialysis are formed between the membranes in each pair. The assembly of spacer plates and membranes are pressed together between a pair of clamping plates by means of clamping rails which extend along and engage grooves provided along the sides of the clamping plates.

9 Claims, 15 Drawing Figures

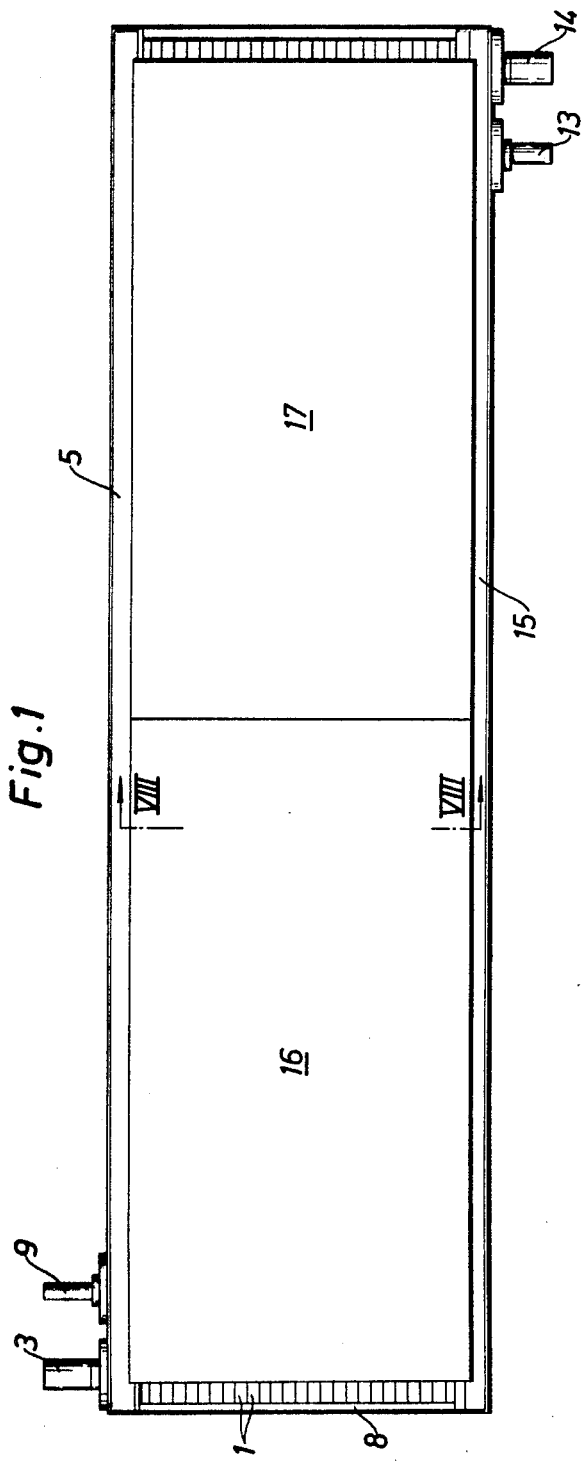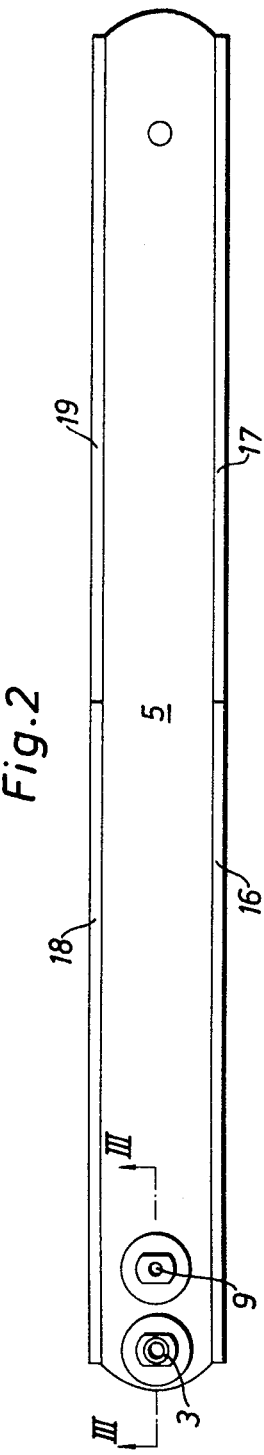

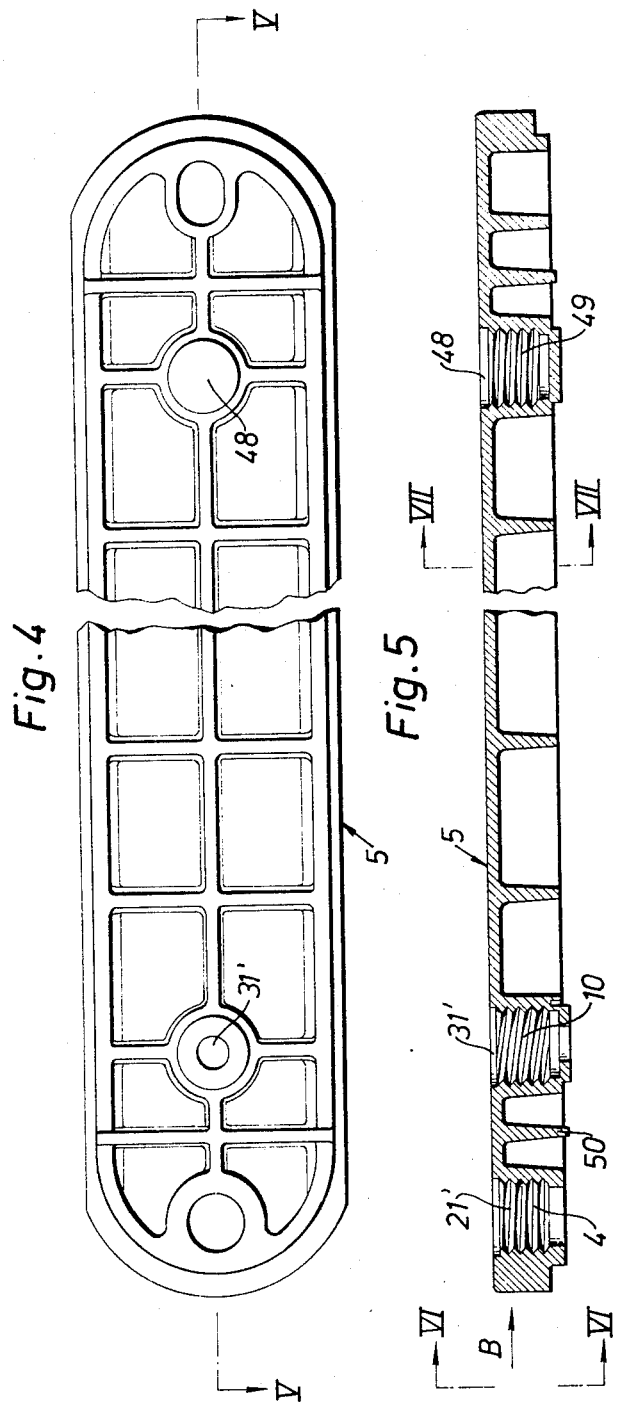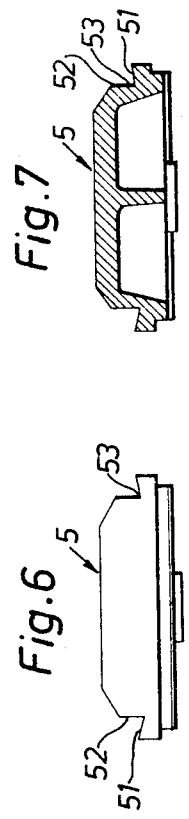

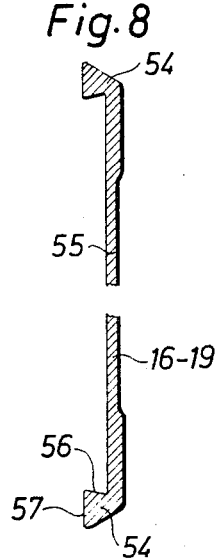
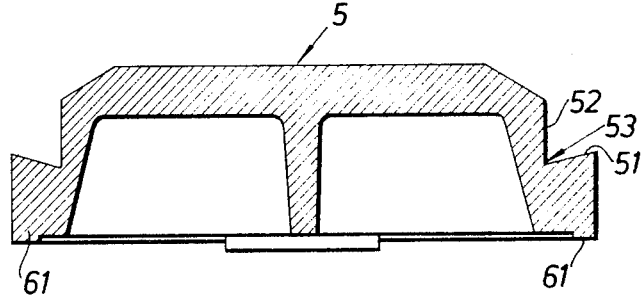
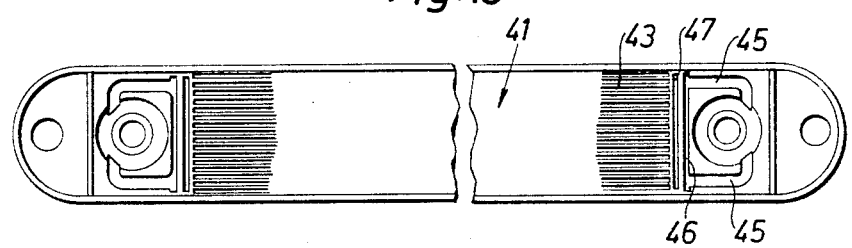
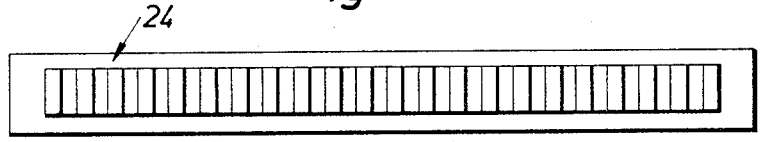
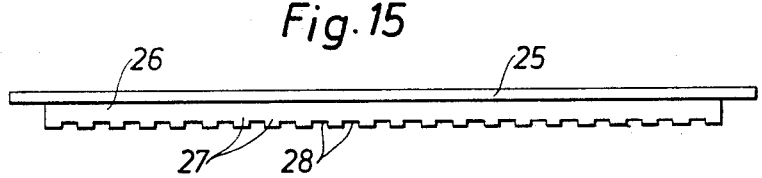

Patented May 22, 1973
3,734,298
5 Sheets-Sheet
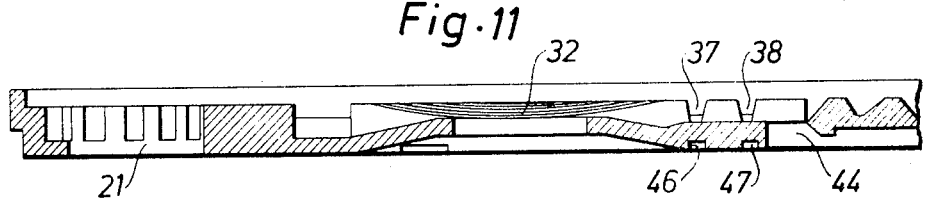
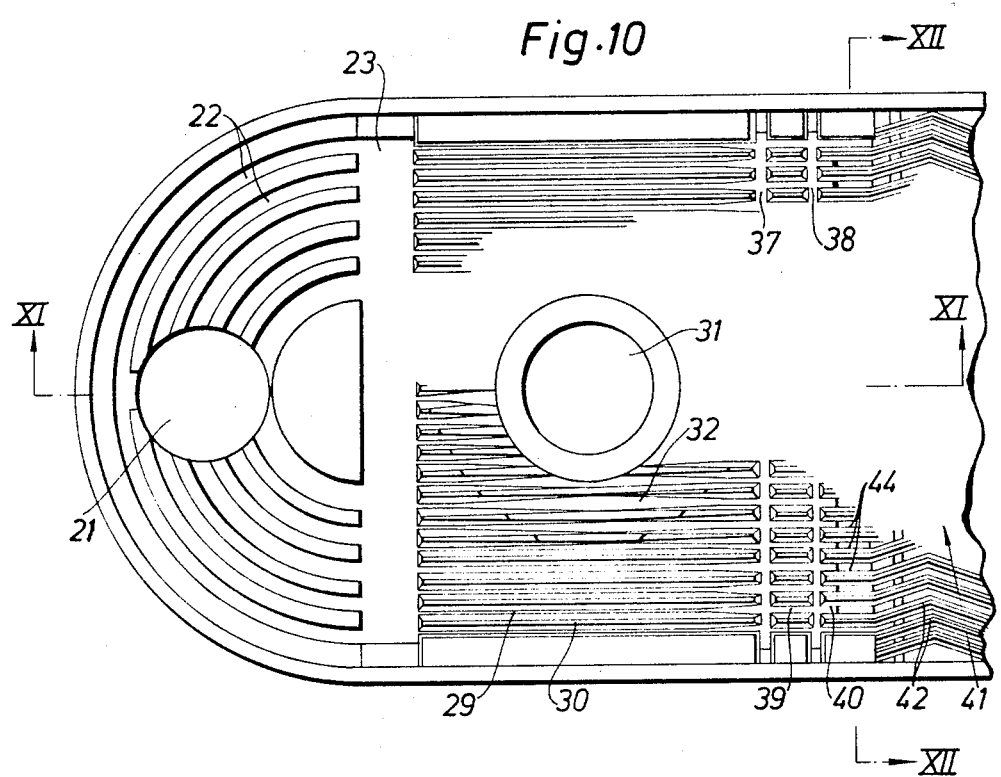
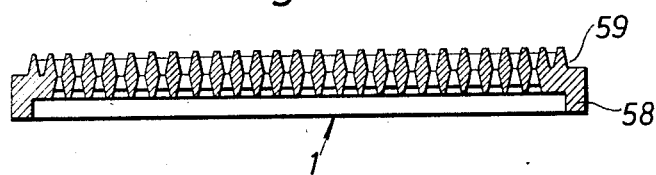

DEVICE FOR DIALYSIS

The present invention relates to a dialysis apparatus, particularly for purification of blood, and comprising a plurality of spacer plates and pairs of intermediate membranes, the spacer plates having such a shape that channels for purification liquid are formed between them and the membranes and channels for the blood or other liquid which is to be purified through dialysis are formed between the membranes in each pair.

The characteristic features of the dialysis apparatus according to the invention more closely appear from the following claims.

As mentioned above the dialysis apparatus according to the invention primarily is designed for purification of blood. Thus, the invention in the following will be described with reference to blood dialysis. For a skilled technician, however, it will be evident from the following specification that the invention of course also may be applied to dialysis of other liquids than blood.

A contemporary dialysis apparatus for purification of blood, i.e., a so-called artificial kidney, should satisfy a plurality of demands. In constructing the kidney according to the present invention it has been aimed to comply with as many of these demands as possible. Examples of such demands are the following.

The dialysis effect should be good even if a very small quantity of blood is used.

The flow resistance in the blood channels should be exceedingly low so that if possible the use of a blood pump may be dispensed with.

The blood quantity remaining after a treatment should be as small possible so that it will not be necessary to supply the patient with any additional blood or at least the smallest possible quantity of blood. Every supplement of blood will namely involve a risk of hepatitis to the patient.

The personnel handling the artificial kidney should not contact either the blood nor the purification liquid because there also in this case exists a risk of hepatitis.

The total weight of the artificial kidney should be as low as possible.

It should be possible to easily manufacture the components of the kidney by mass production so as to permit the kidney to be disposable after use.

The flow of the blood as well as of the salt solution should be uniform over the cross sectional area of the kidney so that all of the blood will be effectively purified.

The artificial kidney should form a completely self-contained system which may be directly connected to suitable hoses for blood and purification liquid. Preferably also the hoses may be of a one-for-all type, so that the whole system can be disposable after use.

In order to provide an effective purification of the blood without using too large a quantity thereof, the kidney should consist of a plurality of components. It must be possible to carry out the mounting of the components in a simple way, and simultaneously every risk of leak between channels for blood and purification liquid should be eliminated.

Membranes included in the kidney for the separation of blood and purification liquid should be effectively supported in order to avoid strains on the membranes of such a magnitude that ruptures might occur.

The above demands and a plurality of further demands are complied with by means of the artificial kidney described below with reference to the accompanying drawings which, by means of an example, illustrate a preferred embodiment of the invention.

FIG. 1 shows the kidney in side elevation.

FIG. 2 shows the kidney in top plan view.

FIG. 4 shows an upper clamping plate forming part of the kidney, as viewed from below.

FIG. 5 is a longitudinal sectional view through the clamping plate on the line V—V of FIG. 4.

FIG. 6 is an end view of the clamping plate in the direction of the arrow B of FIG. 5.

FIG. 7 is a cross sectional view through the clamping plate on the line VII—VII of FIG. 5.

FIG. 8 is a cross sectional view on the line VIII—VIII of FIG. 1 through a clamping rail forming part of the kidney. In FIG. 1 two clamping rails are shown.

FIG. 9 is a sectional view corresponding to FIG. 7 through a lower clamping plate forming part of the kidney. As for the rest the shape of the lower clamping plate generally corresponds to that of the upper clamping plate, and therefore further illustrations or sectional views thereof are omitted.

FIG. 10 is a plan view of one end of a spacer plate forming part of the kidney, as viewed from above.

FIG. 11 is a sectional view of the spacer plate on the line XI—XI of FIG. 10.

FIG. 12 is a sectional view on the line XII—XII of FIG. 10.

FIG. 13 is a bottom view of the spacer plate.

FIGS. 14 and 15 are two views perpendicular to each other of a bridge-shaped element, a plurality of which are used in the kidney.

Figure 3:
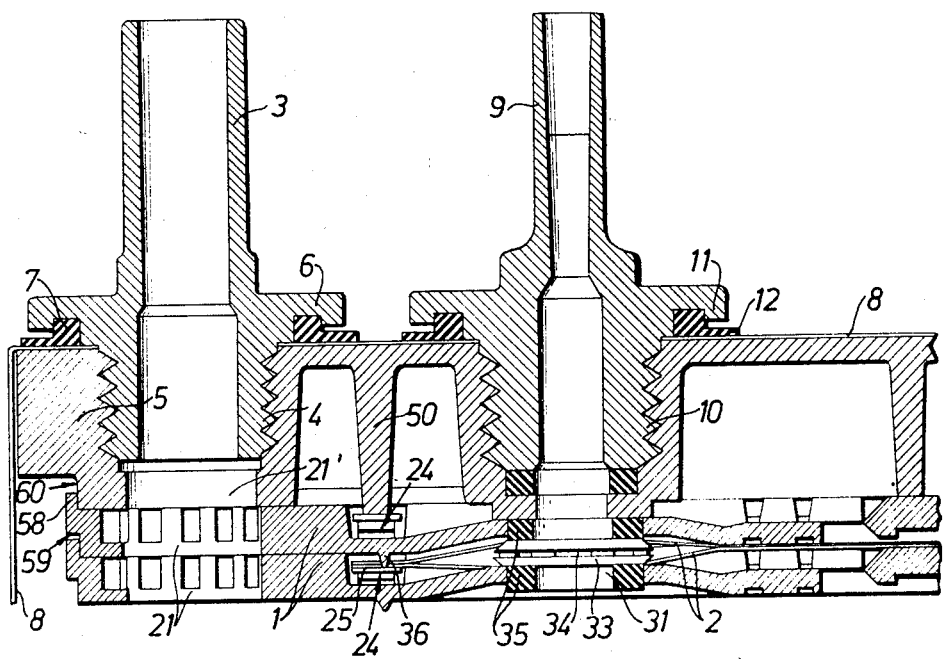
FIG. 3 is a cross sectional view on the line III—III of FIG. 2 through the upper portion of the kidney, only.

As best appears from FIGS. 1–3 the kidney shown by way of example consists of a plurality of spacer plates 1 having pairs of intermediate membranes 2. The purification liquid which may be a common sodium chloride solution including certain medical additives is supplied through a nipple 3. The nipple 3 by means of screw threads 4 is secured in an upper clamping plate 5. The nipple is provided with a flange 6 which by way of a gasket 7 fastens a baglike casing 8 of plastic material.

Similarly there is a nipple 9 adapted to connect with a blood hose (not shown). When the kidney is intended for counter flow dialysis this nipple forms the outlet for the blood. The nipple 9 by means of screw thread 19 is secured in the clamping plate 5 and by way of a flange 11 and a gasket 12 affices the casing 8 of plastic material onto the clamping plate 5.

As shown in FIG. 1 the kidney also at the opposite end on the underside thereof is provided with a blood nipple 13 and a salt solution nipple 14 of a construction corresponding to that of the nipples 3 and 9. The nipples 13 and 14 are secured in a lower clamping plate 15.

The two clamping plates 5 and 15 by means of clamping rails 16, 17, 18 and 19 are drawn toward each other against the intermediate assembly of spacer plates and membranes. The cross sectional shape of the clamping rails appears from FIG. 9.

From the nipple 3 the salt solution flows through a hole 21' in the upper clamping plate 5. The liquid then flows into a through channel formed by openings 21 in the individual spacer plates. Said through channel in the following is referred to as the main channel for the purification liquid and is designated by the numeral 21, as are the individual openings. The continued flow of the salt solution best appears from FIG. 10, 11 and 12. From the main channel 21 the salt solution through a plurality of concentrically disposed arcuate distribution channels 22 flows to a transverse depression 23. In the depression is positioned a bridge-shaped element 24 shown in FIGS. 3, 14 and 15. Said element consists of a sealing strip 25 having a lower supporting strip 26. At the bottom the supporting strip ends in pins 27 with intermediate free passages 28. The pins 27 rest on the bottom of the depression 23 and the salt solution flows under the bridge-shaped element 24 through the free passages 28. The total cross sectional area of the free passages 28 is smaller than the total flow area of the salt solution on either side of the bridge-shaped element. In this way a throttling is obtained along this cross sectional area of the kidney and causes a uniform distribution of the flow of the purification liquid across each of the spacer plates.

From the depression 23 the salt solution flows through channels 29 between longitudinally extending upwards tapering ridges 30. At the center of this portion having the longitudinally extending ridges 30 openings 31 are provided forming a second main channel intended to receive the blood and be with the blood nipple 9. The openings 31 are concentrically surrounded by bowl-shaped recesses 32. As best appears from FIG. 3 said recesses 32 are intended to accommodate blood distribution buttons 33 having a central through bore and radially directed distribution channels 34. The buttons 33 are seated between the membranes 2 and the buttons together with the membranes are squeezed between gaskets 35. Thus, the blood can flow from the main channel formed by the openings 31 and into blood channels between the membranes of a pair of membranes. At the ends, the membranes are sealed by the sealing strips 25 of the bridge-shaped elements 24 and a transverse elevation or ridge 36 on the adjacent spacer plate 1.

From the longitudinal channels 29 the salt solution flows through two transverse distribution channels 37 and 38 and short, longitudinal channels 39 and 40 and then over the virtual dialysis surface 41. Said surface on the one side of the spacer plate consists of zigzag-shaped ridges 42 and on the opposite side of longitudinal ridges 43. At the points where said ridges 42 and 43 cross each other the membranes 2 are effectively squeezed. In this way very small portions of the membranes 2 will be cantilevered. Thus, the risk of ruptures in these portions is small. In order to uniformly distribute the salt solution to either side of the spacer plate the plate is provided with a transverse row of through openings 44.

Just opposite the individual channels in the spacer plate, for instance the channels 29, 37, 38, 39, 40, blood channels are formed therebetween as the membranes are pressed into said channels. In order to provide additional blood channels the spacer plate, as best appears from FIGS. 11 and 13, is provided with gentle depressions 45 which lead to a similar transverse depression 46. A further similar gentle depression 47 is provided which runs parallel to the depression 46. Said depressions are provided in the underside of the spacer plates just opposite the transverse channels 37 and 38. Owing to the design shown a very uniform distribution is obtained for the blood as well as for the salt solution over the cross section area of the kidney.

In FIGS. 4–7 various views and sections of the upper clamping plate 5 are illustrated. This clamping plate is provided with through openings 21' and 31' corresponding to the openings 21 and 31 in the spacer plates. At the opposite end the upper clamping plate is provided with a blind hole 48. This hole is provided with screw threads 49 and has been made for mere manufacturing reasons. It is namely intended to manufacture the clamping plate by means of injection moulding and the hole 48 is necessary in order to evenly remove it from the molds. A transverse ridge 50 corresponds to the transverse ridges 36 of the spacer plates and thus it is intended to provide a pressure just opposite the bridge-shaped elements 24 (see FIG. 3). As for the rest the clamping plate is provided with various recesses and depressions which have been made for manufacturing reasons and therefore do no need be more closely discussed here.

As appears from FIGS. 6 and 7 the top side of the upper clamping plate is provided with longitudinal, slightly inwards sloping surfaces 51 bounded by longitudinal, generally vertical surfaces 52. In the grooves 53 defined by said surfaces the clamping rail 16–19 shown in FIG. 8 is braced. In practice four such clamping rails are usually used. The clamping rails generally have a U-shaped cross section with short legs and a long distance between the legs. The space between the legs 54 widens down to the bottom 55 of the U. The surfaces 56 and 57 of the clamping rails 16–19 correspond to the surfaces 51 and 52.

As best appears from FIG. 3 the spacer plates 1 along the upper edge are provided with an upwardly projecting flange 58. Correspondingly the spacer plates at the lower edge are provided with a peripheral recess 59. Thus, the spacer plates can be nested or telescoped into each other as shown in FIG. 3. Owing to the fact that also the upper clamping plate 5 is provided with a peripheral recess 60 the plate 5 can be nested into the upper spacer plate. From FIG. 9 appears that the lower clamping plate is provided with peripheral flange 61 corresponding to the flanges 58. In this way the lowermost spacer plate can be nested into the lower clamping plate. This shaping facilitates the sealing of the complete kidney assembly. Simultaneously also, the alignment and mounting of the kidney facilitated. In case the construction may greatly not be completely sealed, the whole assembly is additionally enclosed by the bag-like casing 8 of plastic material.

In the illustrated embodiment the pairs of membranes 2 consist of flat-pressed tubes. However it is for instance also possible to use pairs of individual membranes. In this case, however, means must be provided for sealing together the longitudinal edges thereof.

The invention of course is not limited to the embodiment described above but may be varied within the scope of the following claims.

We claim:

1. A dialysis device for use in purifying liquids and having a plurality of elongated spacer plates and pairs of intermediate elongated membranes disposed between each spacer plate, said spacer plates being provided with channels so that when said spacer plates and membranes are arranged in a stacked configuration a purification liquid may be passed between one side of each spacer plate and the adjacent membrane and the liquid to be purified may be passed between said pairs of membranes, the improvement comprising an upper and a lower elongated clamping plate each provided with longitudinal grooves along opposed side edges thereof, and at least two elongated clamping rails provided with projections along opposed side edges thereof for engagement with the grooves in said upper and lower clamping plates whereby said clamping plates and clamping rails when assembled about a stack of spacer plates and pairs of membranes will press the assembly together.

2. A dialysis device as claimed in claim 1 wherein said spacer plates have recessed edges to permit nesting of the plates when stacked.

3. A dialysis device as claimed in claim 2 wherein said upper and lower clamping plates have recessed edges whereby said upper clamping plate may be partially nested in the uppermost spacer plate and the lowermost spacer plate may be partially nested in said lower clamping plate.

4. A dialysis device as claimed in claim 1 and further comprising a plastic bag-like casing surrounding the assembly of spacer plates, pairs of membranes, clamping plates and clamping rails.

5. A dialysis device as claimed in claim 4 wherein said upper and lower clamping plates are provided with threaded openings therein and further comprising threaded nipples provided with flanges thereabout and engaged with said openings for receiving conduits for the liquid to be purified and the purification liquid, said plastic bag-like casing being secured to said clamping plates by the flanges on said nipples.

6. A dialysis device as claimed in claim 1 wherein said upper and lower clamping plates are provided with threaded openings therein and further comprising threaded nipples engaged with said openings for receiving conduits for the liquid to be purified and the purification liquid.

7. A dialysis device as claimed in claim 1 wherein at least two clamping rails are provided in each side of the assembly of spacer plates and pairs of membranes, each clamping rail being shorter than the length of said spacer plates.

8. A dialysis device as claimed in claim 1 wherein the longitudinal grooves along the opposed side edges of said clamping plates comprise a substantially vertical wall and a wall extending outwardly from the bottom of said vertical wall at an angle of less than 90°.

9. A dialysis device as claimed in claim 8 wherein the projections along the opposed side edges of said clamping rails have a wider cross-section at the top thereof than at the bottom thereof to form as inwardly extending inner wall for engagement with the outwardly extending wall of the longitudinal grooves of said clamping plates.

* * * * *